March 11, 1930.  R. BOIZARD  1,750,383
REFLECTOR WATER GAUGE
Filed May 21, 1927  2 Sheets-Sheet 1
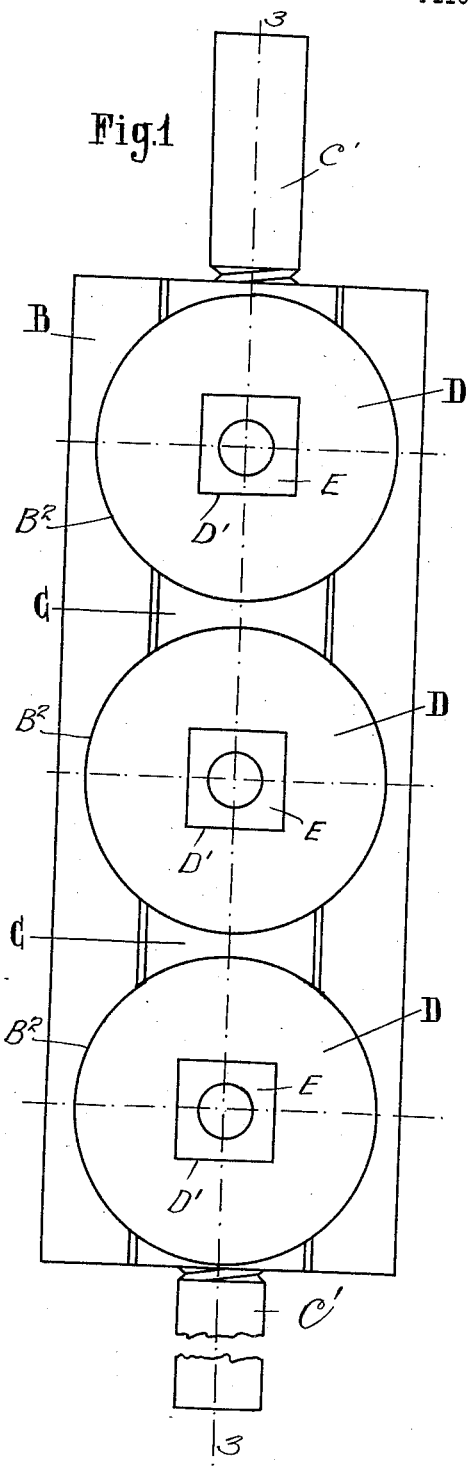
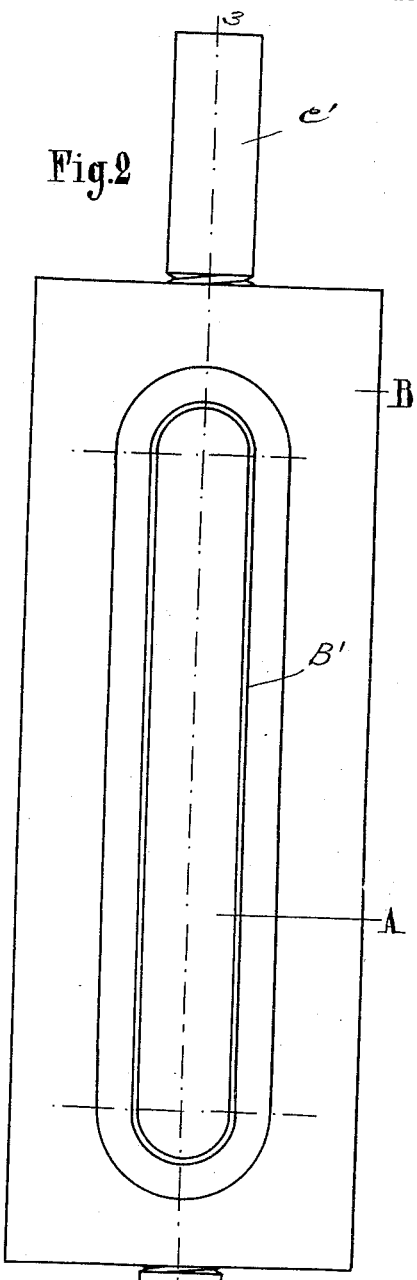
INVENTOR:
Raoul Boizard
BY
ATTORNEY

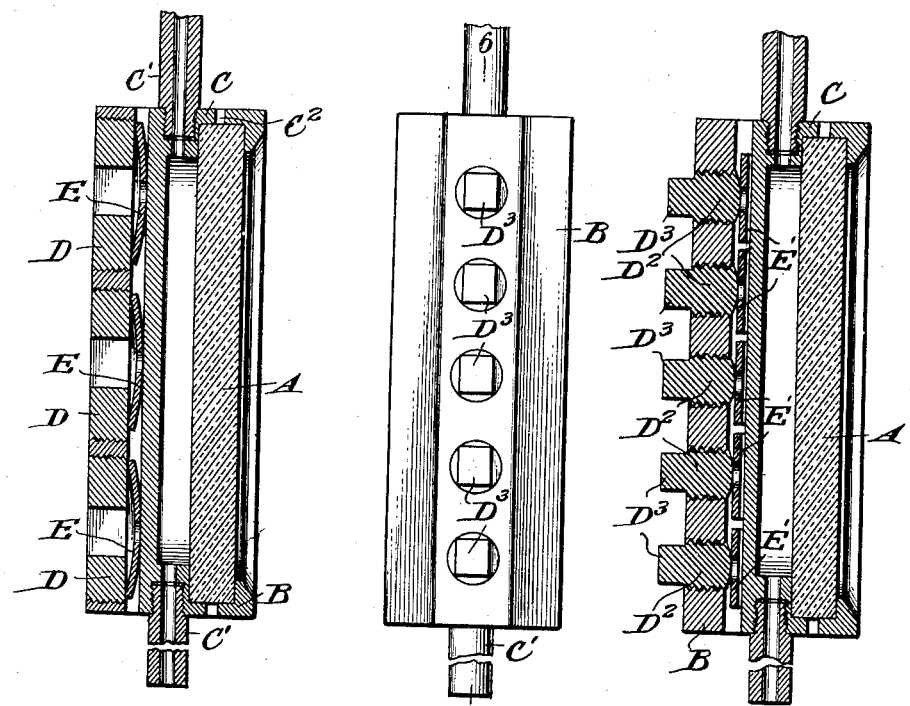

Patented Mar. 11, 1930

1,750,383

UNITED STATES PATENT OFFICE

RAOUL BOIZARD, OF PARIS, FRANCE

REFLECTOR WATER GAUGE

Application filed May 21, 1927, Serial No. 193,288, and in France January 14, 1927.

In reflector water gauges, where the glass is clamped between two rigid metal members, and where the steam pressure of the boiler tends to oppose the clamping action, the tightening required is obtained by means of screws or bolts usually located at opposite sides of the device.

Now, with such an arrangement, and despite the utmost care in assembling the parts, it frequently happens that the reflector glass gets broken even before it has been exposed to boiler heat. This is very often due to two main causes: (1) the glass is not always quite straight nor well dressed, and (2) the tightening effected by the metal members is uneven or too intense, and the members themselves, or either of them, are warped by previous tightenings.

In order to remedy these faults it is possible, as concerns the glass, to improve its quality and to pay even greater attention to its machining, but glass will remain glass, a very fragile material to be handled with the utmost care.

As to the metal members or frames, they may, no doubt, be more carefully designed with a view to better adapt them for their intended use, and they may be modified in order to compensate, as far as possible, for the fragility of the glass.

The object of the present invention is to provide a new and improved reflector water gauge for boilers and the like which will overcome the afore-mentioned defects; such gauge being essentially characterized by the fact that between the tightening screws or bolts and the rear wall of the fluid container, there are positioned, along the longitudinal axis of the device, interchangeable spring washers, preferably of the Belleville type, the strength of which is calculated in accordance with the internal steam pressure to be overcome and the desired tightness to be obtained.

In order to render as clear as possible the description which follows, reference will be made to the accompanying drawings, which represent, by way of example, two forms of gauges according to the invention and, for purposes of comparison therewith, a type of gauge now in use.

In said drawings:

Figures 1 and 2 are, respectively, rear and front elevations of one form of my improved gauge;

Fig. 3 is a longitudinal section on line 3—3 of said figures;

Figs. 4 and 4ª are, respectively, a fragmental plan view and a central cross-section of one of the spring washers;

Fig. 5 is a rear elevation of the other form of gauge mentioned, and Fig. 6 is a longitudinal section thereof on line 6—6;

Figs. 7 and 7ª are, respectively, a plan view and a central cross-section of one of the washers represented in Figs. 5 and 6.

Referring more particularly to Figs. 1–3, A indicates the reflector glass of the gauge, and B the hollow frame or body thereof. The front wall of said body is provided, as usual, with a longitudinal slot B′, behind which the glass A is arranged, while the rear wall has formed in it a vertical series of threaded holes or openings $B^2$ to receive the threaded tightening screws D, these screws having a sleeve-like appearance and being centrally equipped with rectangular sockets D′ for receiving the end of a suitable operating tool (not shown).

An elongated container C, provided at its opposite ends with hollow nipples or extensions C′, is disposed within the body B directly behind the glass A, which latter has its back portion fitting in a seat $C^2$ provided in the front wall of the container; and at the back of the container, directly opposite each sleeve D, there is disposed a dished spring sleeve D, there is disposed a dished spring washer E of the Belleville type, the concave surface of the washer facing the sleeve. The diameter of the washers is a trifle less than that of said sleeves so that said washers, when the sleeves are rotated in a direction to move them inward through the holes $B^2$, will be subjected to a clamping pressure which is transmitted through them to the container C and thence to the glass A.

It will be apparent that with this arrangement of the springs their pressure will be distributed evenly along the longitudinal axis of the fluid container in opposition to the pressure of the steam therewithin, such steam pressure tending to push away the glass which would, of course, be fatal to tightness. Hence, the function of the springs is to overcome the pressure in question and, in so doing, maintain the required tightness of the joints. With that end in view, the springs can be calculated in accordance with the steam pressure which they have to overcome and, since they are individually insertable and removable through the openings B² when the corresponding sleeves have been withdrawn, they can readily be replaced by springs designed to oppose a greater or lesser steam pressure, according to required conditions, and they can be arranged in any desired order in respect of such pressure. The body, needless to say, is disposed horizontally when a spring is being inserted or removed.

The construction illustrated in Figs. 5 and 6 differs from that first described only in that threaded bolts D² are employed in place of the sleeves D, and smaller spring washers E' are used. The latter are shown as rectangular instead of circular and they are removable at either end of the body B when the bolts are loosened. They can likewise be introduced into said body from either end thereof, and in that case also the body is disposed horizontally, and as soon as a washer has been brought into proper position the corresponding bolt is inserted and tightened to keep the washer from falling out. The bolts themselves have rectangular heads D³ by which they can be turned in their openings B³. Further explanation of this form is deemed unnecessary in view of the above.

I claim:

1. A reflector water gauge for boilers and the like, comprising a hollow casing having a sight opening in its front wall; a reflector glass disposed within the casing directly behind said opening; a fluid container in said casing directly behind said glass, a longitudinal series of independently-adjustable tightening members mounted in the rear wall of the casing; and a structurally-separate spring individual to each tightening member to be tensioned thereby and interposed between the same and the rear wall of the fluid container, said springs acting to overcome the internal steam pressure in said container, and to maintain tightness of the joints.

2. A reflector water gauge, comprising a hollow casing having a central longitudinal sight opening in its front wall and a longitudinal series of threaded openings in its rear wall, the threaded openings having their centers arranged in a line which coincides with the median plane of the casing; a reflector glass disposed within the casing directly behind the sight openings; a fluid container within said casing directly behind said glass; an independently-adjustable tightening member mounted in each threaded opening; and a set of dished spring washers, one for each tightening member to be tensioned individually thereby, interposed between the tightening members and the back of the fluid container and adapted to exert their pressure immediately against the latter.

In testimony whereof I affix my signature.

RAOUL BOIZARD.